United States Patent [19]

Schmid et al.

[11] Patent Number: 5,097,887
[45] Date of Patent: Mar. 24, 1992

[54] PROCESS OF MAKING A PRESSURE-DIECAST, FIBER-REINFORCED PART

[75] Inventors: Eberhard E. Schmid, Alzenau; Gunter Neite, Bad Nauheim, both of Fed. Rep. of Germany

[73] Assignee: Metallgesellschaft Aktiengesellschaft, Frankfurt am Main, Fed. Rep. of Germany

[21] Appl. No.: 577,965

[22] Filed: Sep. 5, 1990

[30] Foreign Application Priority Data

Sep. 9, 1989 [DE] Fed. Rep. of Germany ....... 3930081

[51] Int. Cl.$^5$ .............................................. B22D 19/14
[52] U.S. Cl. ...................................... 164/75; 164/97; 164/100; 427/299; 427/404; 427/419.2
[58] Field of Search ................... 164/75, 97, 100, 101; 427/299, 404, 419.2

[56] References Cited

U.S. PATENT DOCUMENTS 4,282,922 8/1981 Hartmann ............................. 164/97
4,899,800 2/1990 Gallerneault et al. .......... 164/100 X

FOREIGN PATENT DOCUMENTS 59-101271 6/1984 Japan .................................. 164/101

Primary Examiner—J. Reed Batten, Jr.
Attorney, Agent, or Firm—Sprung, Horn, Kramer & Woods

[57] ABSTRACT

A preshaped body of ceramic fibers is placed into a mold and molten aluminum-silicon alloy material is charged into the mold. The pressure is increased in a controlled manner so that the shaped fibrous body is penetrated by the molten material and the final pressure is maintained until the molten material has entirely solidified. To permit the use of a distinctly lower final pressure, the shaped fibrous body before it is placed into the mold is impregnated with an aqueous solution of $CuSO_4$, dried at a temperature from 60° to 90° C. and heated to a temperature from 500° to 1200° C., preferably 850° to 1000° C., and the molten material is caused to solidify under a final pressure from 10 to 100 bars.

6 Claims, 4 Drawing Sheets

PROCESS OF MAKING A PRESSURE-DIECAST, FIBER-REINFORCED PART

This invention relates to a process of making a pressure-diecast, fiber-reinforced part from an aluminum-silicon alloy, in which at least one preshaped body is embedded, which consists of ceramic fibers, which have a length from 20 to 300 μm, preferably 60 to 150 μm, and an average diameter of 3 μm and are present in an amount from 5 to 30% by volume of the embedding matrix and are oriented parallel to a selected plane, in which the fibers have a random orientation. The invention relates also to a part which has been made by that process and to the use of such part.

In order to increase the strength of cast parts of aluminum-silicon alloys it is known to charge in the casting operation the molten material into the mold under a pressure which can be adjusted as desired and then to effect a solidification of the molten material under a high pressure in excess of 1000 bars. The resulting higher solidification rate results in a finer solidified structure with a higher content of hard material at the grain boundaries. Because the molten material is charged to assume a very dense state, it is possible to use even high-strength alloys having a poor castability. By experience, a fine solidified structure will improve the resistance of aluminum-silicon alloys to thermal shock. At room temperature, the fatigue strength of parts made from an aluminum alloy of the type $AlSi_{12}CuNiMg$ by pressure diecasting is 20 to 30% higher than the fatigue strength of parts made by the conventional gravity diecasting process.

Pressure diecasting can also be used to make fiber-reinforced parts from aluminum-silicon alloys in that preshaped bodies consisting of ceramic fibers which have a length from 20 to 300 μm and an average diameter of about 3 μm are placed into the mold, the molten material is charged into the mold and the pressure is increased in a controlled manner so that the fibrous body is penetrated by the molten material. Under a final pressure in excess of 1000 bars the spacing of the molten material and the fibers is reduced to an atomic distance so that the reaction takes place which is required for an effective bond between the fibers and the matrix. The fibers are parallel to a plane and have a random orientation in that plane. In accordance with the rule of mixtures the reinforcing fibers result in a higher strength and a higher modulus of elasticity. As the temperature increases, the difference between the strengths of the fiber-free and fiber-reinforced parts increases progressively because the strength of the fibers is hardly changed up to the melting temperature of the matrix. For instance, at temperatures above about 300° C. the strength of the fiber-reinforced aluminum-silicon alloy of the type $AlSi_{12}CuNiMg$ is more than 100% higher than the strength of standard parts. The fatigue strength is also twice as high as at room temperature. The resistance to thermal shock is not only improved by the fine structure obtained by pressure diecasting but is distinctly increased further by the reinforcing fibers.

But a solidification of fiber-reinforced parts under high pressures in excess of 1000 bars involves relatively high production costs because the high pressures require special reinforcements and may result in a deformation of shaped fibrous bodies having a relatively large area.

For this reason it is an object of the present invention so to modify the described process that the molten material which has been charged into the mold can be caused to solidify under a distinctly lower final pressure whereas the desirable mechanical and physical properties are not deteriorated in comparison with properties of fiber-reinforced parts which have solidified under a pressure of and above 1000 bars.

That object is accomplished in that the shaped fibrous body before it is placed into the mold is impregnated with an aqueous solution of $CuSO_4$, dried at a temperature from 60° to 90° C. and heated to a temperature from 500° to 1200° C., preferably 850° to 1000° C., and the molten material is caused to solidify under a final pressure from 10 to 100 bars. The measures adopted in accordance with the invention result in better properties as regards ductility, fracture stress and strength properties, particularly during use at higher temperatures.

It has been found that the process in accordance with the invention can be carried out to special advantage with shaped fibrous bodies consisting of fibers of ceramic oxides of aluminum, magnesium, silicon, zirconium or titanium.

Within the scope of the invention the solution of $CuSO_4$ may be replaced entirely or in part by a solution of $Cu(NO_3)_2$. In accordance with the invention the part made by the process is characterized in that a thin transition layer having a thickness from a monolayer thickness to 1.0 μm, preferably from 0.05 to 0.5 μm, and consisting of copper(II) oxide, copper(I) oxide and/or a mixed oxide of said oxides, is present between the fibers and the matrix surrounding the fibers. The advantages afforded by the process in accordance with the invention will not adversely be affected if that transition layer is dissolved out in part as the molten material penetrates into the shaped fibrous body.

The part made by the process in accordance with the invention may desirably be used to make the walls which define the combustion chambers of internal combustion engines, and particularly to make pistons, specifically the piston head, ring zone, piston pin bosses and skirt.

The advantage afforded by the measures in accordance with the invention will now be explained in more detail and by way of example, with reference to the accompanying drawings, wherein.

A plurality of fiber-reinforced circular blanks were pressure-diecast from an aluminum-silicon alloy of the type $AlSi_{12}CuNiMg$ and were provided with an embedded shaped fibrous body consisting of $Al_2O_3$ fibers present in an amount of about 20% by volume and having an average diameter of 3 μm and a length from 50 to 300 μm and were caused to solidify under a final pressure of 50 bars. Before the shaped fibrous bodies had been placed into the casting mold they had been impregnated with a CuSO₄ solution, dried at 70° C. and burnt at 1000° C. for 2 minutes. Most of the fibers were parallel to the top and bottom surfaces of the circular blank and had a random orientation in said plane.

Figure 1:
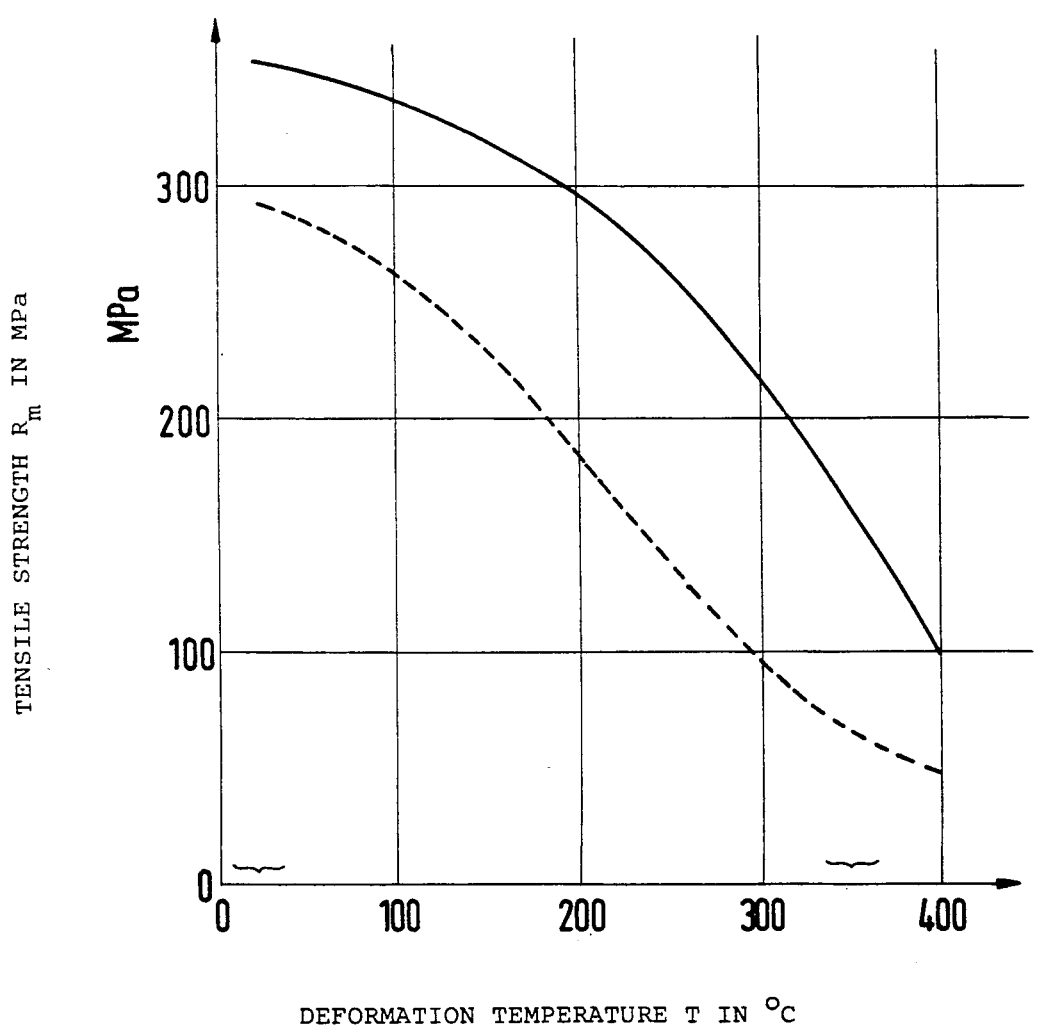
FIG. 1 is a plot of tensile strength versus forming temperature, the broken line representing the prior art, the solid line the present invention.
Figure 2:
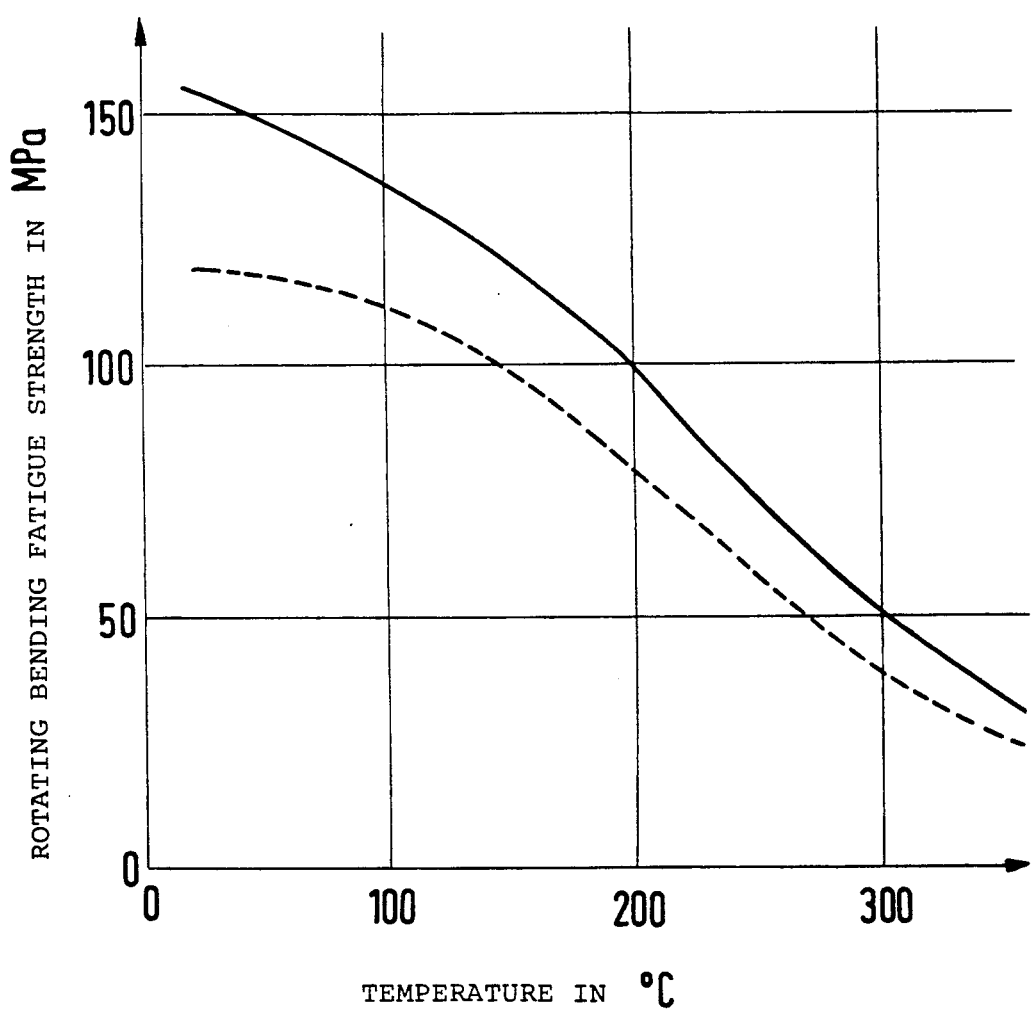
FIG. 2 is a plot of rotating bonding strength versus temperature.
Figure 3:
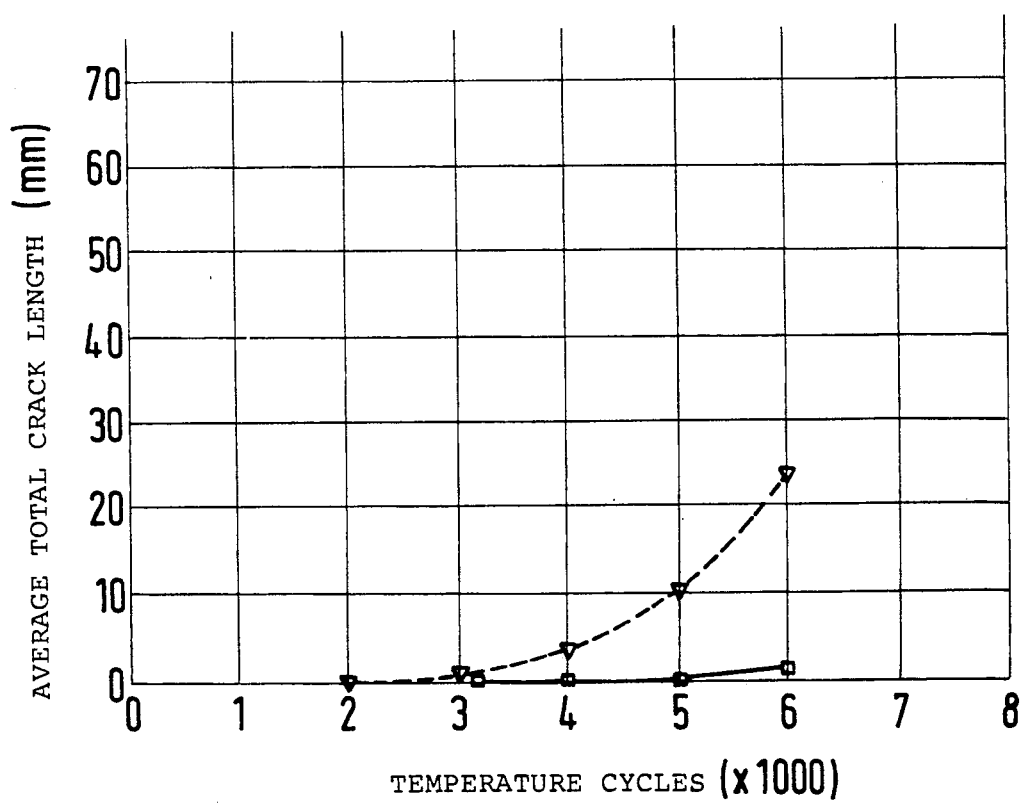
FIG. 3 is a plot of resistance to temperature shock versus cycle.
Figure 4:
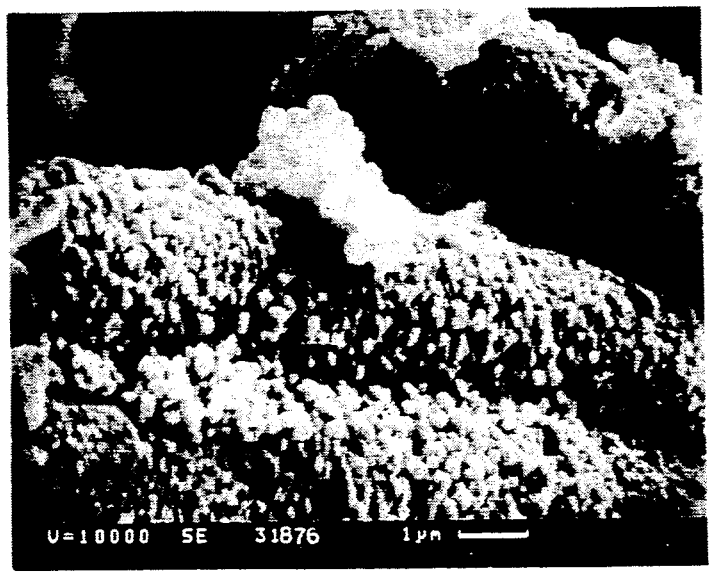
FIG. 4 is a photomicrograph showing the coated fibers adjacent to the edge of the shaped fibrous bodies.
Figure 5:
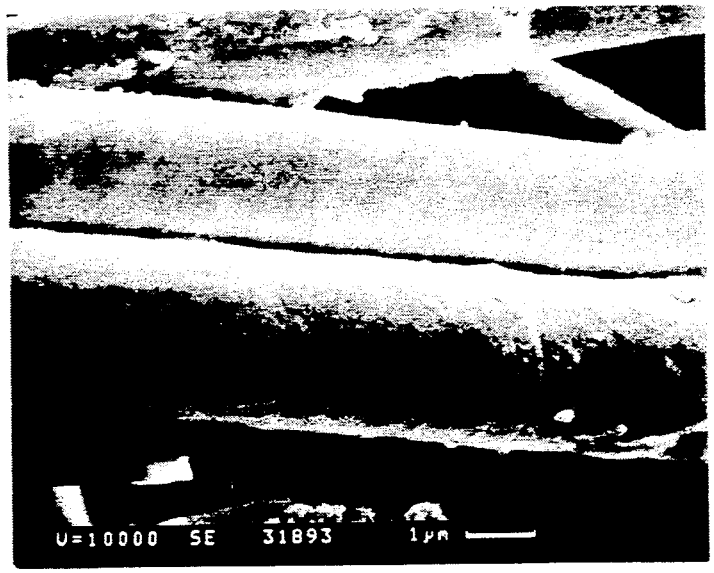
FIG. 5 is a photomicrograph showing the coated fibers in the middle of the shaped fibrous bodies.

The fiber-reinforced specimens were heat-treated at 500° C. for 2 hours, age-hardened at room temperature, hot age-hardened at 230° C. for 5 hours, cooled in moving air and deformed in a uniaxial tensile test at room temperature and at 350° C. The mechanical strength properties determined for said specimens were compared with the corresponding properties of specimens which consisted of the same composite material but differed from the composite material in accordance with the invention in that they had no copper oxide transition layer between the matrix consisting of the aluminum silicon alloy and the fibers of the shaped fibrous body. The comparison reveals that particularly the values obtained for the tensile strength (FIG. 1), the rotating bending strength (FIG. 2) and the resistance to temperature shock (FIG. 3) are almost identical to the corresponding values of specimens which differed from the composite material in accordance with the invention in that they did not comprise copper oxide transition layers between the fibers and the embedding matrix and had been made by pressure diecasting under a final pressure of 1200 bars. To determine the resistance to temperature shock each specimen was heated in 6000 cycles from room temperature to 350° C. by a gas flame for 15.5 seconds, subsequently cooled by an air blast for 15.5 seconds, then immersed in water for 15.5 seconds, and finally dried by an air blast for 15.5 seconds. The resistance to temperature shock is indicated by the total length of the cracks which are formed in the range of action of the gas flame in a circular area 20 mm in diameter. The values for the modulus of elasticity, the 0.05% offset elongation limit and the fracture stress were improved, particularly at elevated temperatures. FIGS. 4 and 5 are micrographs made by a scanning electron microscope and showing shaped fibrous bodies which had been treated with CuSO₄ and subsequently heat-treated at 1000° C. The fibers had a granular rough copper oxide coating (FIG. 4) adjacent to the edge of the specimen and a smooth copper oxide coating (FIG. 5) in the middle of the specimen.

It will be understood that the specification and examples are illustrative but not limitative of the present invention and that other embodiments within the spirit and scope of the invention will suggest themselves to those skilled in the art.

What is claimed is:

1. In the making of a selectively fiber-reinforced, cast part from an aluminum-silicon alloy by placing into a mold a preshaped body of ceramic fibers, the fibers occupying from about 5 to 30% by volume of the preshaped body, lying essentially in planes parallel to a selected plane and having an essentially random orientation within such planes, charging into said mold molten aluminum-silicon alloy material for the casting, increasing the pressure in the mold to a final pressure so that the shaped fibrous body is penetrated by the molten material, and maintaining the final pressure until the molten material has entirely solidified, the improvement which comprises, prior to placing the ceramic fiber body into the mold, impregnating the ceramic fiber body with an aqueous solution of at least one of CuSO₄ and Cu(NO₃)₂, drying at a temperature from about 60° to 90° C., heating the impregnated ceramic fiber body to a temperature from 500° to 1200° C., and solidifying the molten material under a final pressure from about 10 to 100 bars.

2. A process according to claim 1, wherein the shaped fibrous body which has been impregnated and dried is heated to a temperature from about 850° to 1000° C.

3. A process according to claim 1, wherein the shaped fibrous body consists of fibers of ceramic oxides of at least one of aluminum, magnesium, silicon, zirconium and titanium.

4. A process according to claim 1, wherein the impregnating solution is of CuSO₄.

5. A process according to claim 1, wherein the impregnating solution is of Cu(NO₃)₂.

6. A process according to claim 1, wherein the ceramic fiber body is impregnated with sufficient solution ultimately to provide a thin transition layer of a thickness from a monolayer to about 1.0 μm, and consisting of at least one of copper(II) oxide and copper(I) oxide between the fibers and the alloy material surrounding the fibers.

* * * * *